(12) United States Patent
Hayashi et al.

(10) Patent No.: US 12,148,286 B2
(45) Date of Patent: Nov. 19, 2024

(54) PRECISION LENGTH MEASURING DEVICE

(71) Applicant: MITUTOYO CORPORATION, Kanagawa (JP)

(72) Inventors: Nobuyuki Hayashi, Kanagawa (JP); Takefumi Kiwada, Gifu (JP); Aki Hiroshima, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 58 days.

(21) Appl. No.: 17/245,596

(22) Filed: Apr. 30, 2021

(65) Prior Publication Data

US 2021/0366246 A1 Nov. 25, 2021

(30) Foreign Application Priority Data

May 21, 2020 (JP) .................................. 2020-089086

(51) Int. Cl.
*G08B 5/22* (2006.01)
*G01B 21/16* (2006.01)
(Continued)

(52) U.S. Cl.
CPC ................ *G08B 5/22* (2013.01); *G01B 21/16* (2013.01); *G01L 1/22* (2013.01); *G01P 7/00* (2013.01); *G01P 15/00* (2013.01); *H05B 47/105* (2020.01)

(58) Field of Classification Search
CPC .......... G01B 3/22; G01B 3/205; G01B 11/02; G01B 11/0608; G01B 3/002; G01B 3/18; G01B 3/20; G01B 5/18; G01B 7/02; G01B 21/16; G01B 5/004; G01B 5/061; G01B 5/12; G01B 5/14; G01B 5/207; B01L 2300/0627; G09G 3/3208
See application file for complete search history.

(56) References Cited

U.S. PATENT DOCUMENTS 7,382,269 B2 * 6/2008 Remsburg ................ F24F 11/52
200/61.04
7,721,455 B2 * 5/2010 Matsumiya ............ G01B 3/205
33/783

(Continued)

FOREIGN PATENT DOCUMENTS

EP 3 093 181 A2 11/2016
JP 57-026892 2/1982
(Continued)

OTHER PUBLICATIONS

European Search Report dated Sep. 30, 2021, 7 pages.
(Continued)

*Primary Examiner* — Alvaro E Fortich
*Assistant Examiner* — Martin Walter Braunlich
(74) *Attorney, Agent, or Firm* — Rankin, Hill & Clark LLP

(57) ABSTRACT

A measuring device includes a measured value obtainer, a display device configured to display a measured value obtained by the measured value obtainer, an illumination device configured to emit a light to the display device, a measurement state obtainer configured to obtain information regarding a state in which a measured value is obtained by the measured value obtainer, and an illumination color changer configured to change a color of the light in accordance with a measurement state obtained by the measurement state obtainer.

11 Claims, 15 Drawing Sheets

NORMAL MEASUREMENT MODE (WHITE)

TOLERANCE DETERMINATION MODE (GREEN)

(51) Int. Cl.
*G01L 1/22* (2006.01)
*G01P 7/00* (2006.01)
*G01P 15/00* (2006.01)
*H05B 47/105* (2020.01)

(56) References Cited

U.S. PATENT DOCUMENTS

| | | | |
|---|---|---|---|
| 8,898,923 B2* | 12/2014 | Nahum | G01L 1/2206 |
| | | | 33/810 |
| 9,377,282 B2* | 6/2016 | Dockrey | G01B 21/04 |
| 9,678,701 B2* | 6/2017 | Cook | G01B 3/205 |
| 10,451,450 B2* | 10/2019 | Niwano | G01D 7/00 |
| 2008/0249737 A1 | 10/2008 | Jordil et al. | |
| 2009/0320553 A1 | 12/2009 | Weston et al. | |
| 2010/0073812 A1 | 3/2010 | Shibata | |
| 2011/0197665 A1 | 8/2011 | Sakata et al. | |
| 2013/0055579 A1 | 3/2013 | Hayashi et al. | |
| 2013/0226507 A1 | 8/2013 | Tsujimoto et al. | |
| 2014/0150570 A1 | 6/2014 | Nahum et al. | |
| 2015/0059480 A1 | 3/2015 | Dockrey et al. | |
| 2018/0023945 A1 | 1/2018 | Mariller et al. | |
| 2019/0164169 A1 | 5/2019 | Lai | |

FOREIGN PATENT DOCUMENTS

| | | |
|---|---|---|
| JP | 61-087314 | 6/1986 |
| JP | 06-202102 A | 7/1994 |
| JP | 11-045530 | 2/1999 |
| JP | 11-052330 | 2/1999 |
| JP | 2000-206917 | 7/2000 |
| JP | 2001-005087 A | 1/2001 |
| JP | 2001-063403 A | 3/2001 |
| JP | 2001-312917 | 11/2001 |
| JP | 2002-014655 | 1/2002 |
| JP | 2002-131037 | 5/2002 |
| JP | 2002-335591 A | 11/2002 |
| JP | 2003-143275 | 5/2003 |
| JP | 2003-194624 | 7/2003 |
| JP | 2005-096564 A | 4/2005 |
| JP | 2005-137403 | 6/2005 |
| JP | 2005-140517 A | 6/2005 |
| JP | 2005-158304 A | 6/2005 |
| JP | 2006-208330 A | 8/2006 |
| JP | 2006-226948 | 8/2006 |
| JP | 2007-199559 | 8/2007 |
| JP | 2008-111706 | 5/2008 |
| JP | 2008-256696 A | 10/2008 |
| JP | 2008-149693 | 12/2008 |
| JP | 2009-536335 A | 10/2009 |
| JP | 2011-169616 A | 9/2011 |
| JP | 2012-068208 A | 4/2012 |
| JP | 2013-174554 A | 9/2013 |
| JP | 2013-234951 | 11/2013 |
| JP | 2014-064166 | 4/2014 |
| JP | 2014-115287 A | 6/2014 |
| JP | 2015-025777 A | 2/2015 |
| JP | 2015-049247 A | 3/2015 |
| JP | 2015-105865 A | 6/2015 |
| JP | 2016-210321 A | 12/2016 |
| JP | 2016-212290 A | 12/2016 |
| JP | 2016-213752 A | 12/2016 |
| JP | 2018-128311 | 8/2018 |
| JP | 2019-100769 | 6/2019 |

OTHER PUBLICATIONS

Japanese Office Action dated Nov. 21, 2023, Application No. 2020-089086; English translation included, 14 pages.
Japanese Office Action issued on Feb. 27, 2024, Application No. 2020-089086; English translation included, 12 pages.

* cited by examiner

NORMAL MEASUREMENT MODE (WHITE)

TOLERANCE DETERMINATION MODE (GREEN)

MAXIMUM-MINIMUM MEASUREMENT MODE (BLUE)

ACCUMULATED EVALUATION
OF IMPACT HISTORY

| SMALL IMPACT | NOT INFLUENCING ON MEASURING | INFLUENCING ON MEASURING |

←  SMALL      1ST THRESHOLD        2ND THRESHOLD       LARGE →

FIG. 12B        IMPACT IS SMALL (WHITE)

FIG. 12C        NOT INFLUENCING ON MEASURING (BLUE)

FIG. 12D        INFLUENCING ON MEASURING (RED)

MAINTENANCE IS NOT NEEDED (WHITE)

MAINTENANCE IS NEEDED (RED)

FIG. 15B  MAINTENANCE IS NOT NEEDED (WHITE)

FIG. 15C  MAINTENANCE IS RECOMMENDED (BLUE)

FIG. 15D  MAINTENANCE IS NEEDED (RED)

2 0 2 0 - US 12,148,286 B2

PRECISION LENGTH MEASURING DEVICE

CROSS-REFERENCE TO RELATED APPLICATION

This application is based upon and claims the benefit of priority of the prior Japanese Patent Application No. 2020-089086, filed on May 21, 2020, the entire contents of which are incorporated herein by reference.

FIELD

A certain aspect of embodiments described herein relates to a measuring device.

BACKGROUND

Conventionally, a measuring device such as a caliper, a micrometer, a digital indicator or the like may have a display device for displaying various information such as a measured value, and a back light for emitting a light to a back of the display device (for example, see Japanese Patent Application Publication No. 2008-111706). When the back light emits a light to the display device, it is easy to read information displayed by the display device in a dark place.

SUMMARY

However, even if the back light emits a light to the display device, it may be difficult to read information displayed by the display device in some conditions during obtaining information from the display device, such as an eyesight of a measurer using a measuring device.

In one aspect of the present invention, it is an object to easily obtain various information through a display device of a measuring device.

According to an aspect of the present invention, there is provided a measuring device including: a measured value obtainer; a display device configured to display a measured value obtained by the measured value obtainer; an illumination device configured to emit a light to the display device; a measurement state obtainer configured to obtain information regarding a state in which a measured value is obtained by the measured value obtainer; and an illumination color changer configured to change a color of the light in accordance with a measurement state obtained by the measurement state obtainer.

BRIEF DESCRIPTION OF DRAWINGS

FIG. 12B illustrates a display example of a liquid crystal display device in a case where an impact applied to a caliper is small;

FIG. 12C illustrates a display example of a liquid crystal display device in a case where there is a history of an impact applied to a caliper but the impact does not influence on measurement;

FIG. 12D illustrates a display example of a liquid crystal display device in a case where there is a history in which an impact influencing on measurement is applied to a caliper;

FIG. 15B illustrates a display example of a display device in a case where maintenance of a caliper is not needed;

FIG. 15C illustrates a display example of a display device in a case where maintenance of a caliper is recommended; and FIG. 15D illustrates a display example of a display device in a case where maintenance of a caliper is needed.

DESCRIPTION OF EMBODIMENTS

First Embodiment

Figure 1:
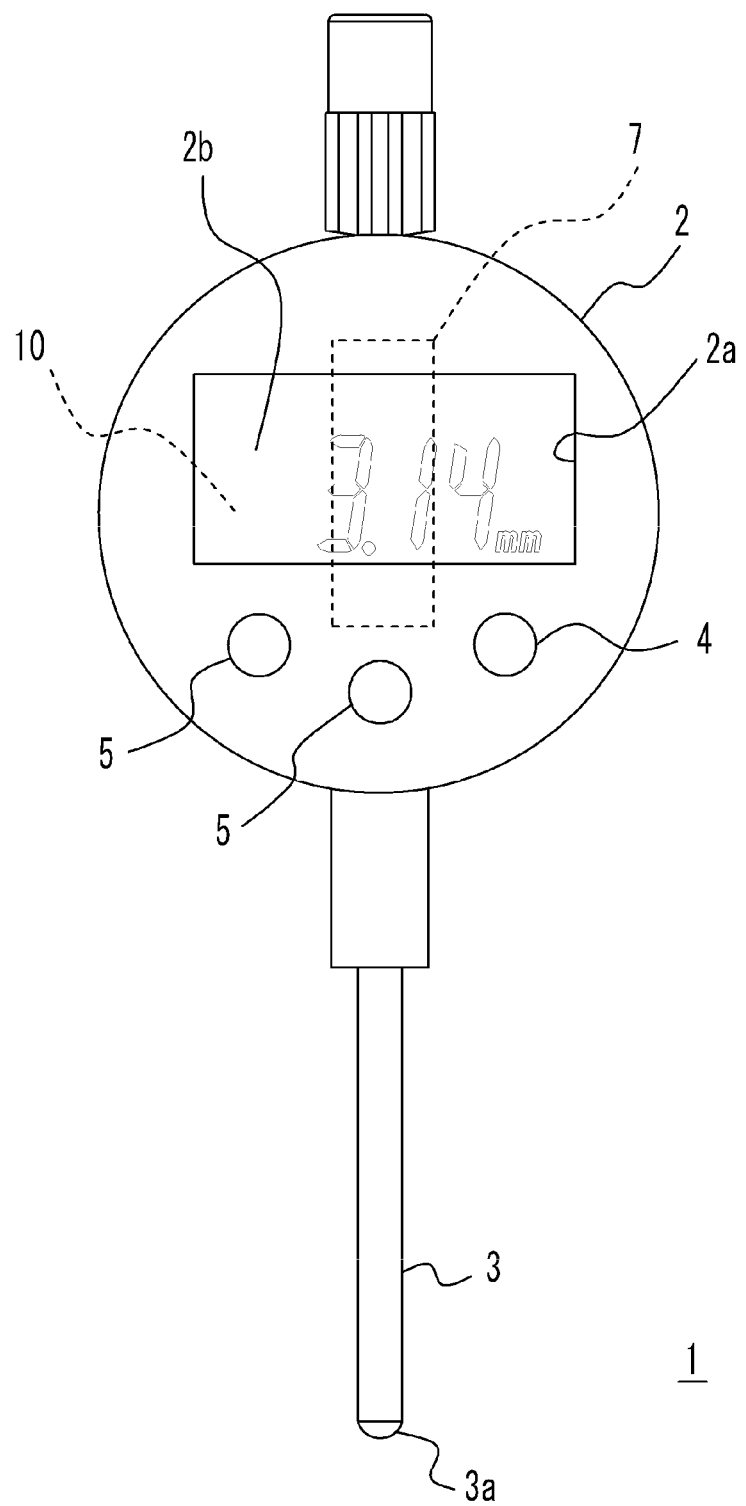
FIG. 1 illustrates a front view of a digital indicator of a first embodiment.
Figure 2:
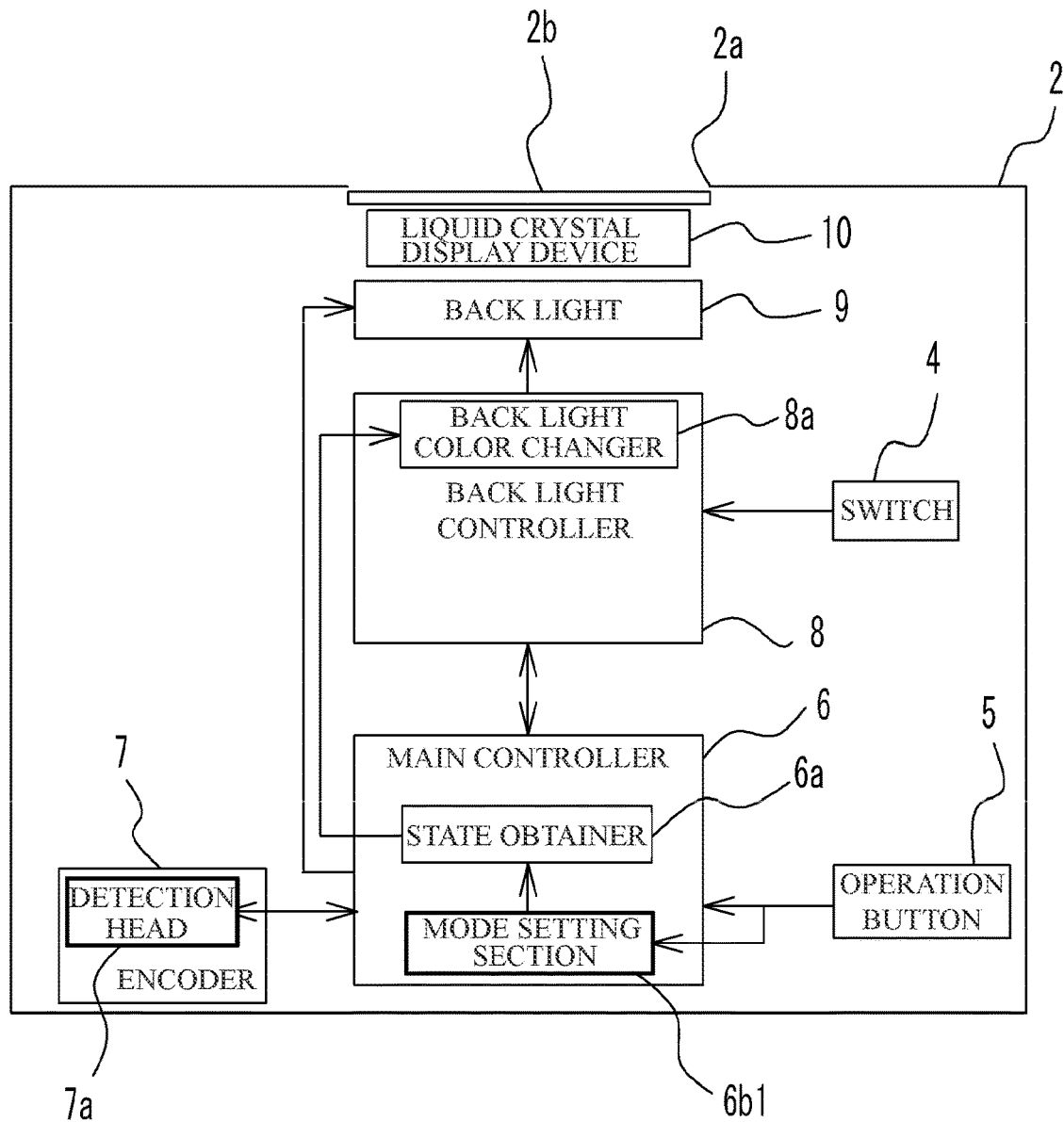
FIG. 2 illustrates an outline of an inner structure of a digital indicator of a first embodiment.
Figure 3A:
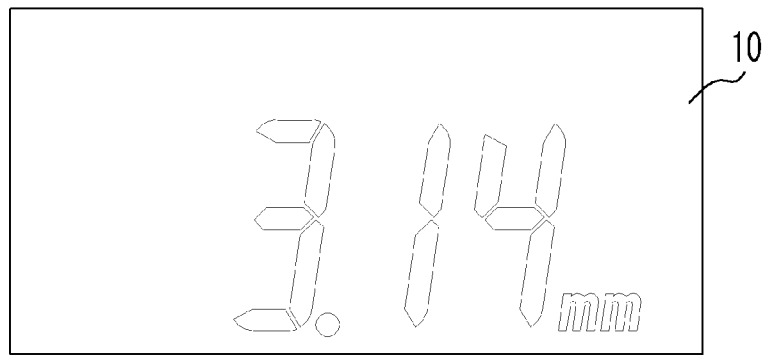
FIG. 3A illustrates a display example of a display device in a case where a normal measurement mode is selected.
Figure 3B:
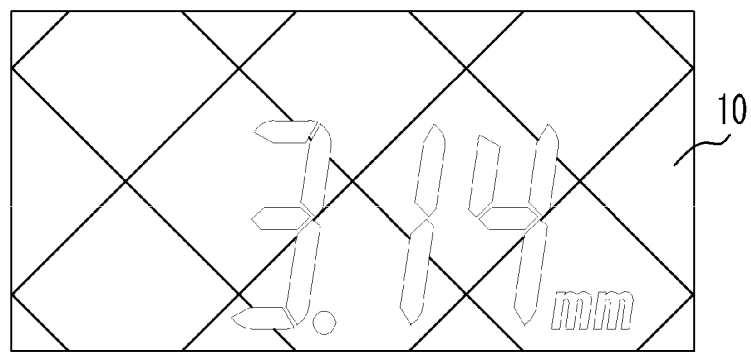
FIG. 3B illustrates a display example of a display device in a case where a tolerance determination mode is selected.
Figure 3C:
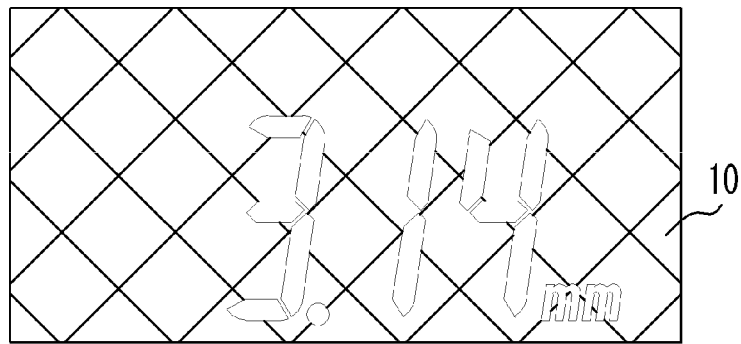
FIG. 3C illustrates a display example of a display device in a case where a maximum-minimum measurement mode is selected.

A description will be given of a digital indicator 1 which is one example of measuring devices in accordance with a first embodiment, on the basis of FIG. 1 to FIG. 3C. FIG. 1 illustrates a front view of the digital indicator 1. FIG. 2 schematically illustrates an internal structure of the digital indicator 1. FIG. 3A illustrates a display example of a display device (a liquid crystal display device 10) in a case where a normal measurement mode is selected. FIG. 3B illustrates a display example of the liquid crystal display device 10 in a case where a tolerance determination mode is selected. FIG. 3C illustrates a display example of the liquid crystal display device 10 in a case where a maximum-minimum measurement mode is selected.

The digital indicator 1 is a measuring device of a digital type. The digital indicator 1 has a chassis 2 and a spindle 3. The spindle 3 acts as a mover having a gauge head 3a provided on an edge of the spindle 3. The spindle 3 is capable of sliding with respect to the chassis 2. The gauge head 3a contacts a surface of a measurement object. The chassis 2 has a switch 4 and an operation button 5. As illustrated in FIG. 2, a main controller 6, an encoder 7, a back light controller 8, a back light 9 and the liquid crystal display device 10 are provided in the chassis 2. The back light 9 acts as an illumination device. A measured value obtainer includes the encoder 7 together with the spindle 3.

The chassis 2 has a window 2a. A parting plate 2b is provided in the window 2a. The parting plate 2b is a transparent board. The liquid crystal display device 10 provided in the chassis 2 faces the parting plate 2b. The display device includes the liquid crystal display device 10 and the parting plate 2b. The back light 9 is provided on the back side of the liquid crystal display device 10. The back side of the liquid crystal display device 10 is an inner side of the chassis 2 compared to the liquid crystal display device 10. The back light 9 emits a light to the liquid crystal display device 10 from the back side thereof.

The main controller 6 makes the encoder 7 detect a displacement amount of the spindle 3, in accordance with a signal from the operation button 5 or the back light controller 8. The main controller 6 makes the liquid crystal display device 10 display a measured value or other information. The measured value is calculated on the basis of the detected displacement amount. The main controller 6 has a measurement state obtainer 6a and a measurement mode setting section 6b1.

The measurement mode setting section 6b1 sets the measurement mode of the digital indicator 1 by operating the operation button 5. In the embodiment, it is possible to select and set a normal measurement mode, a tolerance determination mode and a maximum-minimum measurement mode. In the normal measurement mode, a displacement amount of the spindle 3 is measured under a condition that the gauge head 3a contacts the measurement object, and the measured value is displayed. In the tolerance determination mode, it is determined whether the measured result with respect to the measurement object is within a predetermined allowable tolerance. For example, in the tolerance determination mode, it is determined whether the displacement amount of the spindle 3 under the condition that the gauge head 3a contacts the measurement object is within the predetermined allowable tolerance. And, the liquid crystal display device 10 displays the determination result. In the maximum-minimum measurement mode, at least one of a maximum value and a minimum value of the measured values of the measurement object is measured. For example, in the maximum-minimum measurement mode, the maximum value and the minimum value of the displacement amount of the spindle 3 under the condition that the gauge head 3a contacts the measurement object are recorded. And the liquid crystal display device 10 displays the recorded values. In the maximum-minimum measurement mode, a difference between the maximum value and the minimum value may be recorded as amplitude. And the liquid crystal display device 10 may display the recorded value.

The measurement mode setting section 6b1 gives the measurement state obtainer 6a the measurement mode information indicating which measurement mode is selected, as the information regarding the state in which the measured value is obtained. In the digital indicator 1, the measurement mode information indicating which measurement mode is selected is an example of the information regarding the state in which the measured value is obtained.

The encoder 7 has a detection head 7a provided in the spindle 3, and an electromagnetic type scale arranged along a sliding direction of the spindle 3. The scale and the detection head 7a detect the displacement amount of the spindle 3 with respect to the chassis 2. The detection head 7a is electrically connected with the main controller 6.

The back light controller 8 is electrically connected with the main controller 6. The back light controller 8 is electrically connected with the back light 9. The back light controller 8 switches the electrical power supply mode to the back light 9 by operating the switch 4. The back light controller 8 controls turning on of the back light 9 and turning off of the back light 9. The digital indicator 1 has a battery inside of the chassis 2. When the back light 9 receives electrical power from the battery, the back light 9 is turned on. The back light 9 is electrically connected with the main controller 6.

The back light controller 8 has a back-light color changer 8a acting as an illumination color changer to change the color of the back light 9. The back-light color changer 8a changes the color of the back light in accordance with the measurement mode which is set by the measurement mode setting section 6b1.

A description will be given of an example of a combination of the measurement mode which is selected and set, and the color of the back light, on the basis of FIG. 3A to FIG. 3C. FIG. 3A to FIG. 3B illustrate differences of the color by types of hatching.

FIG. 3A illustrates the liquid crystal display device 10 in a case where the normal measurement mode is selected. When the normal measurement mode is selected, the back light 9 illustrated in FIG. 2 emits a white color light and the liquid crystal display device 10 glows white. On the other hand, FIG. 3B illustrates the liquid crystal display device 10 in a case where the tolerance determination mode is selected. When the tolerance determination mode is selected, the back light 9 emits a green color light and the liquid crystal display device 10 glows green. FIG. 3C illustrates the liquid crystal display device 10 in a case where the maximum-minimum measurement mode is selected. When the maximum-minimum measurement mode is selected, the back light 9 emits a blue color light and the liquid crystal display device 10 glows blue.

In this manner, the color of the back light 9 changes in accordance with the selected measurement mode. Therefore, when the measuring person discriminates the color of the back light 9, the measuring person can immediately know which measurement mode is selected. That is, the measuring person can know which measurement mode is selected even if the measuring person does not read letters or icons displayed on the liquid crystal display device 10.

In the embodiment, the back light 9 is set up so that the color of the back light 9 changes among the predetermined three colors in accordance with measurement mode. However, the measuring person can freely set the colors of the back light 9 corresponding to each measurement mode by operating the operation button 5.

In the first embodiment, the description of the digital indicator 1 is given. However, other measuring devices having an illumination device for emitting a light to the display device and having a plurality of measurement modes can change the color of the illumination device in accordance with the measurement mode. Other measuring devices are such as a caliper, a micrometer or the like.

Second Embodiment

Figure 4:
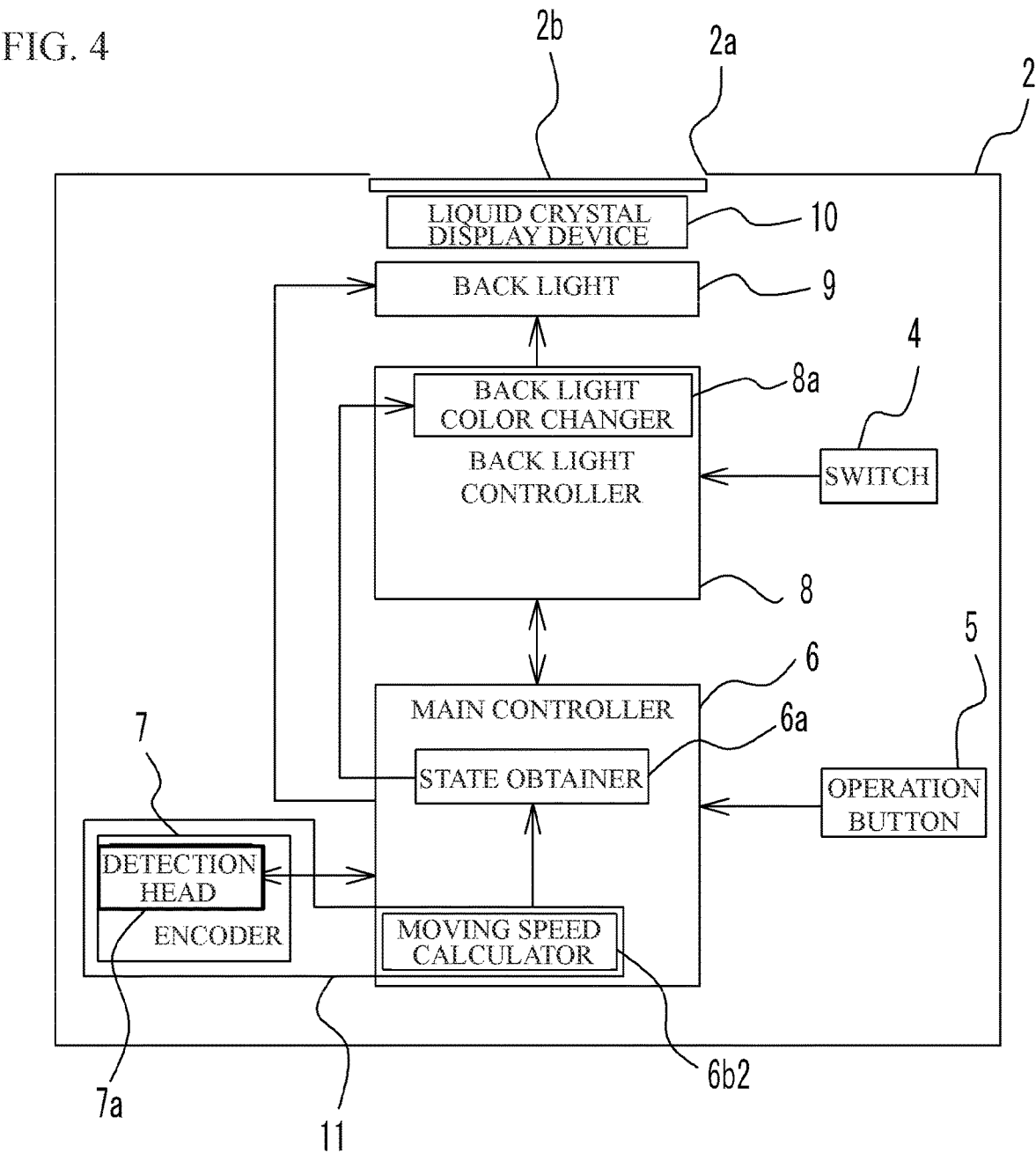
FIG. 4 illustrates an outline of an inner structure of a digital indicator of a second embodiment.
Figure 5A:
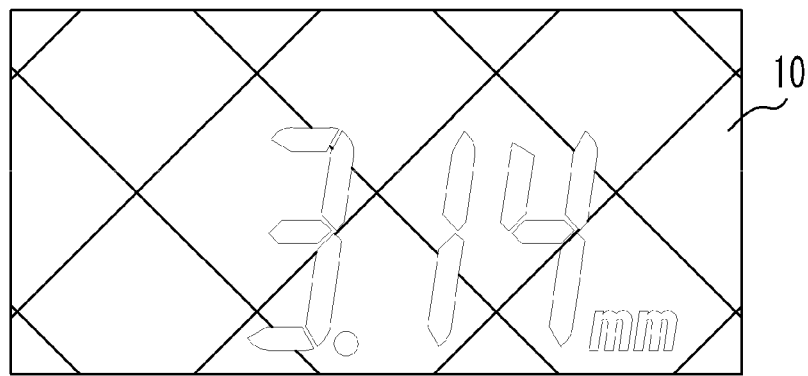
FIG. 5A illustrates a display example of a display device in a case where a moving speed of a spindle of a digital indicator is excessively small.
Figure 5B:
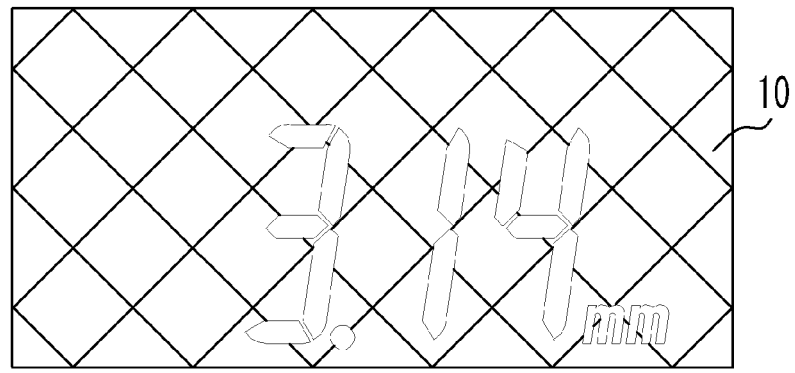
FIG. 5B illustrates a display example of a display device in a case where a moving speed of a spindle of a digital indicator is adequate.
Figure 5C:
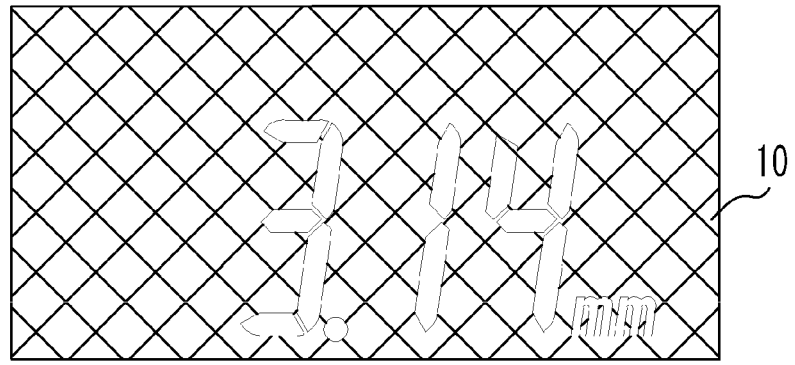
FIG. 5C illustrates a display example of a display device in a case where a moving speed of a spindle of a digital indicator is excessively large.
Figure 6:
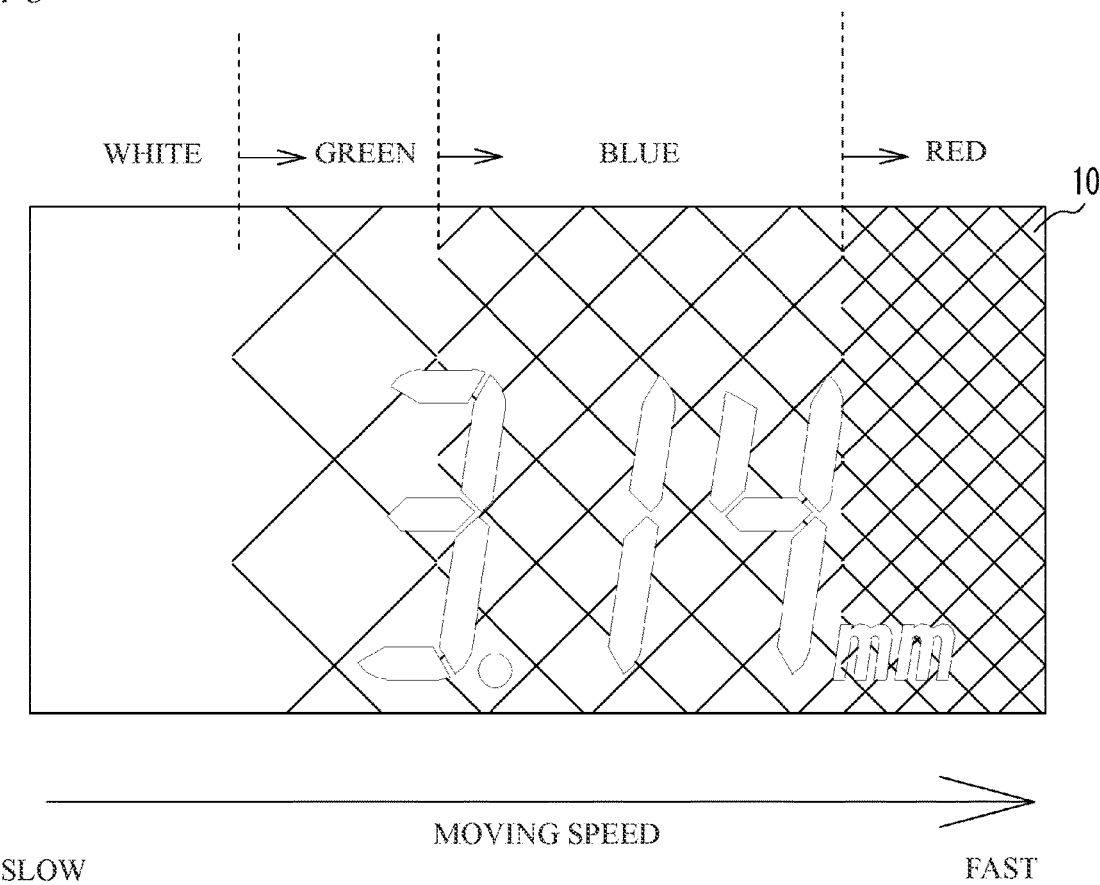
FIG. 6 illustrates a display example of a display device in which a color of a back light changes in steps in accordance with a moving speed of a spindle.

Next, a description of a second embodiment will be given on the basis of FIG. 4 to FIG. 6. FIG. 4 illustrates an inner structure of the digital indicator 1 in accordance with the second embodiment. FIG. 5A illustrates a display example of the display device (the liquid crystal display device 10) in a case where a moving speed of the spindle 3 of the digital indicator 1 is excessively small. FIG. 5B illustrates a display example of the display device (the liquid crystal display device 10) in a case where the moving speed of the spindle 3 of the digital indicator 1 is adequate. FIG. 5C illustrates a display example of the display device (the liquid crystal display device 10) in a case where the moving speed of the spindle 3 of the digital indicator 1 is excessively large. FIG. 6 illustrates a display example of the display device in which the color of the back light changes in steps in accordance with the moving speed of the spindle 3.

A description will be given of points of the second embodiment which are different from those of the first embodiment. In the second embodiment, the same reference numerals are added to the same structure elements in the figures, as those of the first embodiment. The same reference numerals are also added to the same structure elements not illustrated in FIG. 4 to FIG. 6, as those of the first embodiment. Detail explanations of the same structure elements are omitted.

The second embodiment includes a moving speed calculator 6b2, in addition to the measurement mode setting section 6b1 of the digital indicator 1 of the first embodiment. The moving speed calculator 6b2 is included in a moving speed detector 11 together with the encoder 7. The moving speed detector 11 detects the moving speed of the spindle 3 of the measured value obtainer. In FIG. 4, the measurement mode setting section 6b1 is not illustrated. The moving speed calculator 6b2 may be equipped instead of the measurement mode setting section 6b1.

In concrete, the moving speed detector 11 samples a displacement amount of the spindle 3 which is detected by the encoder 7. The moving speed detector 11 calculates the moving speed of the spindle 3, on the basis of the sampled values. The moving speed detector 11 determines whether the moving speed of the spindle 3 is excessively small, adequate, or excessively large, by comparing the moving speed with a first threshold determined in advance or a second threshold which is larger than the first threshold. That is, the moving speed detector 11 determines that the moving speed is excessively small when the moving speed of the spindle 3 is smaller than the first threshold. The moving speed detector 11 determines that the moving speed is adequate when the moving speed of the spindle 3 is equal to or more than the first threshold and smaller than the second threshold. The moving speed detector 11 determines that the moving speed is excessively large when the moving speed of the spindle 3 is equal to or more than the second threshold.

As information regarding the state in which the measured values are obtained, the moving speed detector 11 supplies information regarding the moving speed of the spindle 3 to the measurement state obtainer 6a. The information regarding the moving speed of the spindle 3 is an example of the information regarding the state in which the measured values are obtained. The information regarding the moving speed of the spindle 3 is also an example of the operation state information regarding the operation state in which the measured value obtainer including the spindle 3 obtains the measured values.

When the moving speed of the spindle 3 is large, it may not be necessarily possible to appropriately measure the peak. There may be a case where the digital indicator 1 has an auto-off function in which the digital indicator 1 is automatically turned off when the digital indicator 1 is not used, and the auto-off function is used. In this case, the auto-off function may be activated. When the moving speed of the spindle 3 is excessively small, the measurement efficiency may be degraded. And so, in the embodiment, the information regarding the moving speed of the spindle 3 is obtained. It is determined whether the spindle 3 moves with the adequate moving speed. The liquid crystal display device 10 displays the determined result.

A description will be given of an example of a combination of the moving speed of the spindle 3 and the color of the back light, on the basis of FIG. 5A to FIG. 5C. FIG. 5A to FIG. 5B illustrate differences of the color by types of hatching.

FIG. 5A illustrates the liquid crystal display device 10 in a case where the moving speed of the spindle 3 is excessively low. When the moving speed of the spindle 3 is excessively low, the back light 9 emits a green color light and the liquid crystal display device 10 glows green. On the other hand, FIG. 5B illustrates the liquid crystal display device 10 in a case where the moving speed of the spindle 3 is adequate. When the moving speed of the spindle 3 is adequate, the back light 9 emits a blue color light and the liquid crystal display device 10 glows blue. FIG. 5C illustrates the liquid crystal display device 10 in a case where the moving speed of the spindle 3 is excessively high. When the moving speed of the spindle 3 is excessively high, the back light 9 emits a red color light and the liquid crystal display device 10 glows red.

In this manner, the color of the back light 9 changes in accordance with the moving speed of the spindle 3. Therefore, when the measuring person discriminates the color of the back light 9, the measuring person can immediately know whether the measuring using the digital indicator 1 is appropriately performed. The measuring person can change the operation of the digital indicator 1 and adjust the moving speed of the spindle 3 so that the back light emits the blue light. Thus, it is possible to perform precise measurement using the digital indicator 1.

In this manner, the color of the back light 9 indicates the moving speed range of the spindle 3. In FIG. 5A to FIG. 5C, all area of the liquid crystal display device 10 is illuminated by a single color light. On the other hand, as illustrated in FIG. 6, the color of the back light 9 may gradually change in accordance with the moving speed of the spindle 3. For example, as illustrated in FIG. 6, the liquid crystal display device 10 is divided into several areas in the width direction. And, the first area in FIG. 6 which is a leftmost one is illuminated by a white color light. In the width direction, the second area next to the first area is illuminated by a green color light. The third area next to the second area is illuminated by a blue color light. The fourth area next to the third area is illuminated by a red color light.

When the moving speed of the spindle 3 is small, all areas of the liquid crystal display device 10 are illuminated by the white color light. When the moving speed gets higher, the second area is illuminated by the green color light. When the moving speed gets further higher, the third area is illuminated by the blue color light. When the moving speed gets further higher, the fourth area is illuminated by the red color light. In this manner, the moving speed of the spindle 3 may be indicated by the gradation of the displayed color.

In the embodiment, as one example, the color of the back light 9 changes among the four colors in accordance with the moving speed of the spindle 3. However, the measuring person may optionally set the colors of the back light 9 by operating the operation button 5.

In the second embodiment, the description of the digital indicator 1 is given. However, other measuring devices, in which an illumination device for emitting a light to the display device is provided and the gauge head moves during the measurement, can change the color of the illumination device in accordance with the moving speed of the gauge head. Other measuring devices are such as a caliper, a micrometer or the like. The moving speed may be detected by an acceleration sensor.

Figure 7:
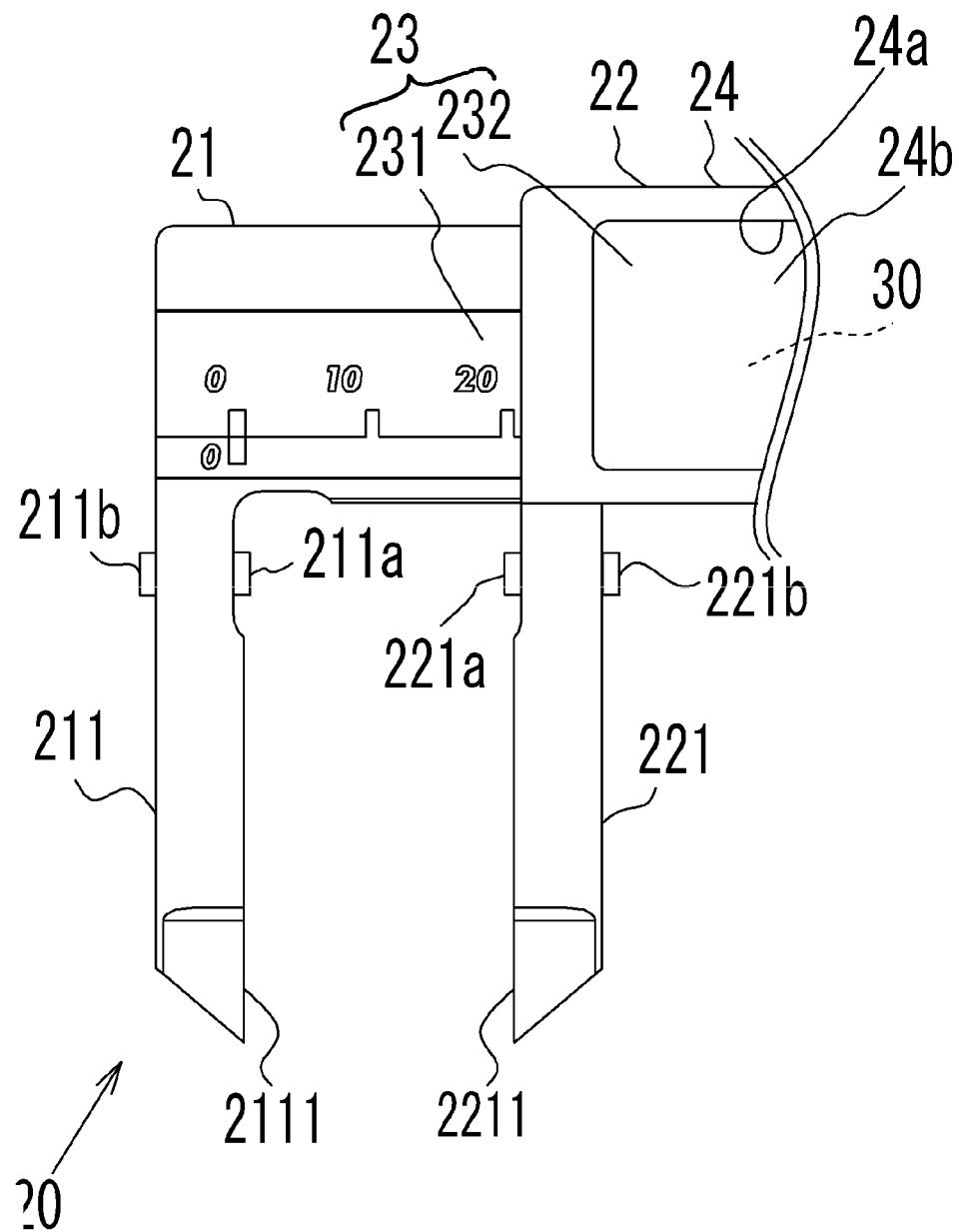
FIG. 7 illustrates a part of a caliper of a third embodiment.
Figure 8:
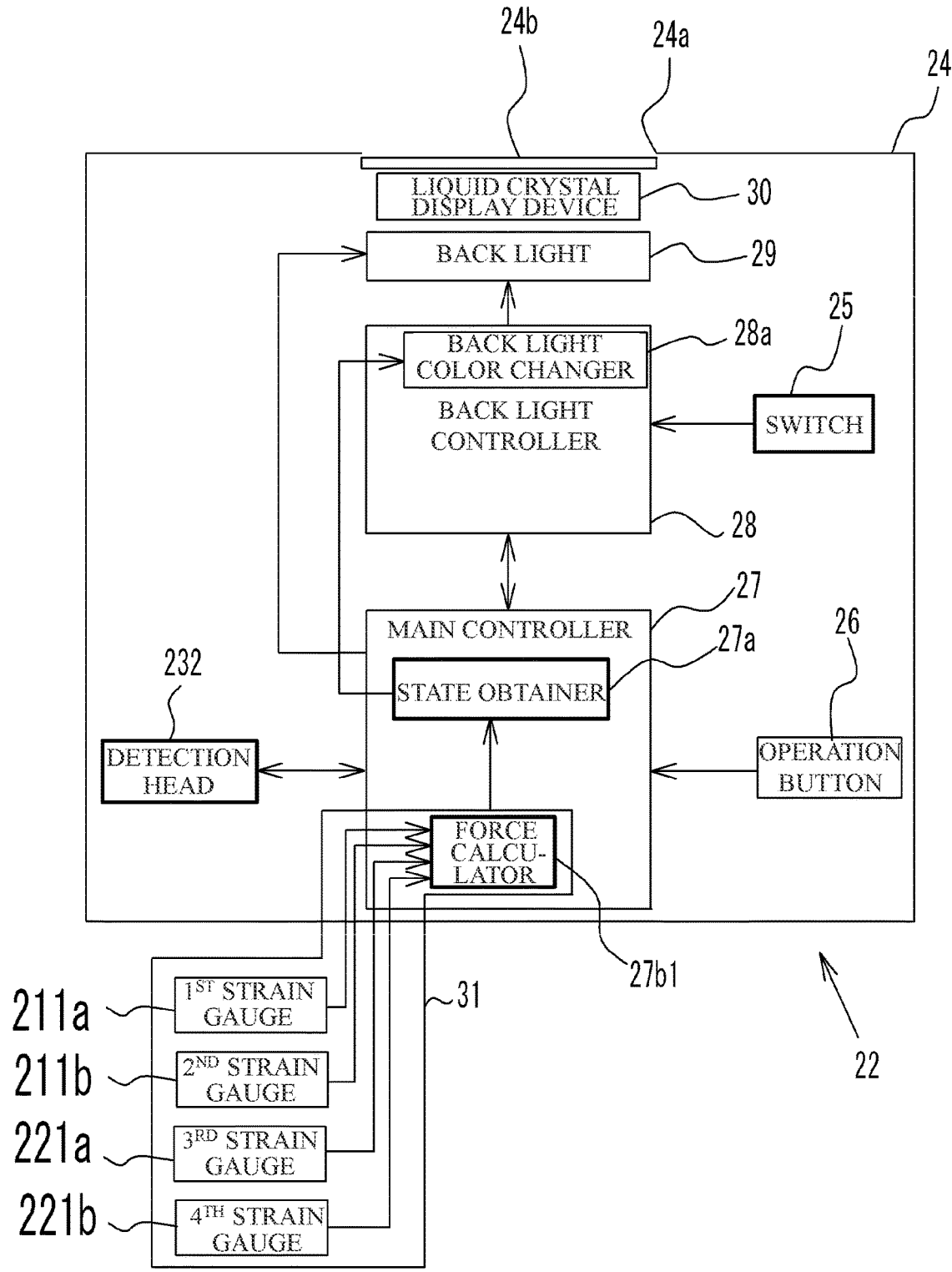
FIG. 8 illustrates an outline of an inner structure of a slider of a caliper of a third embodiment.
Figure 9A:
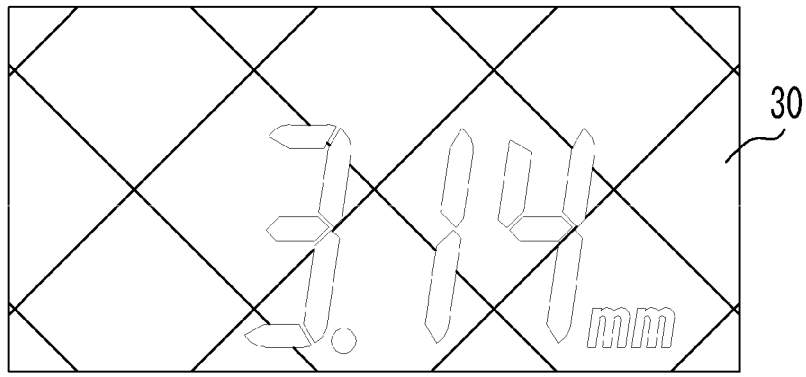
FIG. 9A illustrates a display example of a display device in a case where contactors of a caliper hold ae measurement object together with each other.
Figure 9B:
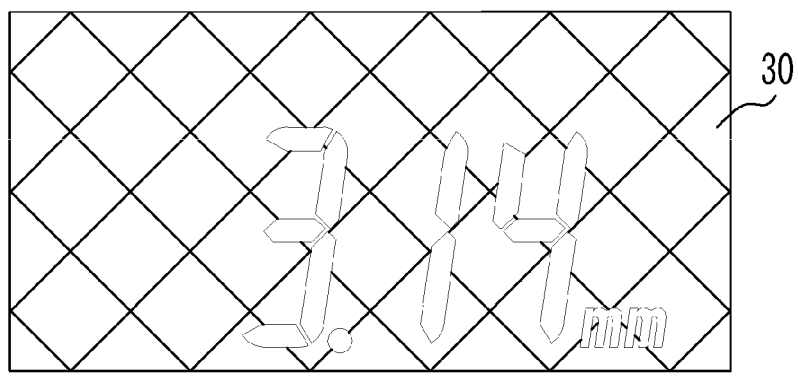
FIG. 9B illustrates a display example of a display device in a case where contactors hold a measurement object with an adequate force.
Figure 9C:
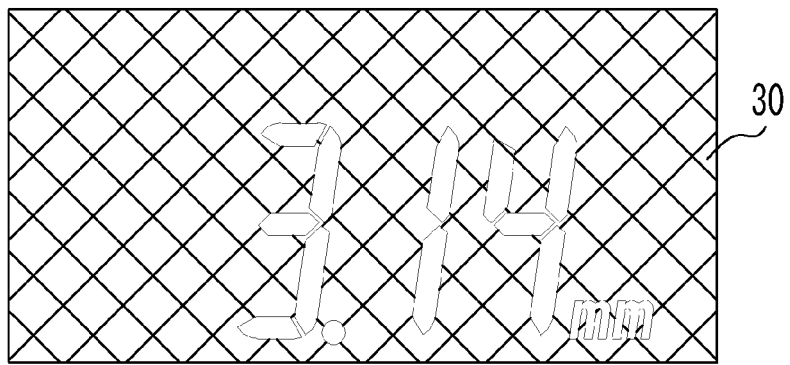
FIG. 9C illustrates a display example of a display device in a case where contactors hold a measurement object with an excessively large force.

(Third embodiment) A description will be given of a third embodiment, on the basis of FIG. 7 to FIG. 9C. FIG. 7 illustrates a part of a caliper 20 of a third embodiment. FIG. 8 illustrates an inner structure of a slider 22 of the caliper 20 of the third embodiment. FIG. 9A illustrates a display example of the display device (the liquid crystal display device 30) in a case where contactors 2111 and 2211 of the caliper 20 hold the measurement object together with each other. FIG. 9B illustrates a display example of the display device (the liquid crystal display device 30) in a case where the contactors 2111 and 2211 hold the measurement object with an adequate force. FIG. 9C illustrates a display example of the display device (the liquid crystal display device 30) in a case where the contactors 2111 and 2211 hold the measurement object with an excessively large force.

The caliper 20 is a digital type measuring device. The caliper 20 has a main scale 21, the slider 22 and an encoder 23. The slider 22 acts as a mover which is capable of relatively moving with respect to the main scale 21. The encoder 23 detects a displacement amount of the slider 22 with respect to the main scale 21. The measured value obtainer includes the main scale 21, the slider 22 and the encoder 23. The main scale 21 has a first measuring jaw 211 which is provided on one edge portion of the main scale 21 in a longitudinal direction of the main scale 21. The contactor 2111 for contacting the measurement object is provided on an edge portion of the first measuring jaw 211. The slider 22 has a chassis 24 and a second measuring jaw 221. The second measuring jaw 221 is provided on one edge of the chassis 24 and faces the first measuring jaw 211 of the main scale 21. The contactor 2211 is provided on an edge portion of the second measuring jaw 221 and faces the contactor 2111 of the first measuring jaw 211.

A first strain gauge 211a and a second strain gauge 211b are provided on a root portion of the first measuring jaw 211. The first strain gauge 211a is provided on a face facing the second measuring jaw 221. The second strain gauge 211b is provided on a face opposite to the face on which the first strain gauge 211a is provided. A third strain gauge 221a and a fourth strain gauge 221b are provided on a root portion of the second measuring jaw 221. The third strain gauge 221a is provided on a face facing the first measuring jaw 211. The fourth strain gauge 221b is provided on a face opposite to the face on which the third strain gauge 221a is provided. The location of the first strain gauge 211a, the second strain gauge 211b, the third strain gauge 221a and the fourth strain gauge 221b of FIG. 7 is one example. The location is not limited to FIG. 7 and may be arbitrarily changed.

The encoder 23 includes a scale 231 and a detection head 232. The scale 231 is an electromagnetic type scale provided along a longitudinal direction of the main scale 21. The detection head 232 is included in the slider 22. The scale 231 and the detection head 232 detect a displacement amount of the slider 22 with respect to the main scale 21, together with each other. The encoder 23 acts as a part of the measured value obtainer, together with the contactors 2111 and 2211.

As illustrated in FIG. 8, the chassis 24 of the slider 22 has a switch 25 and an operation button 26. The chassis 24 houses a main controller 27, the detection head 232 acting as a part of the encoder 23, a back light controller 28, a back light 29 acting as an illumination device, and a liquid crystal display device 30.

The chassis 24 has a window 24a. A parting plate 24b is provided in the window 24a. The parting plate 24b is a transparent board. The liquid crystal display device 30 provided in the chassis 24 faces the parting plate 24b. The display device includes the liquid crystal display device 30 and the parting plate 24b.

The main controller 27 controls the encoder 23 in accordance with a signal from the operation button 26 or the back light controller 28. In accordance with the control, the encoder 23 detects a displacement amount of the slider 22 with respect to the main scale 21. The main controller 27 makes the liquid crystal display device 30 digitally show the measured value calculated based on the detected displacement amount or other information. The main controller 27 has a measurement state obtainer 27a and a force calculator 27b1. The force calculator 27b1 is electrically connected to the first strain gauge 211a, the second strain gauge 211b, the third strain gauge 221a and the fourth strain gauge 221b.

A force detector 31 includes the force calculator 27b1 together with the first strain gauge 211a, the second strain gauge 211b, the third strain gauge 221a and the fourth strain gauge 221b. The force detector 31 detects the force applied to the contactors 2111 and 2211 of the measured value obtainer.

That is, the force detector 31 detects the force applied to the contactors 2111 and 2211, from the strain amount of the first measuring jaw 211 and the strain amount of the second measuring jaw 221 during holding the measurement object by the contactors 2111 and 2211. It is possible to determine whether the measurement object is held by an adequate force, by detecting the force applied to the contactors 2111 and 2211. The force detector 31 determines whether the force applied to the measurement object by the contactors 2111 and 2211 is adequate, by comparing the force applied to the contactors 2111 and 2211 with a threshold defined in advance. That is, the force detector 31 determines that the force is adequate when the force applied to the contactors 2111 and 2211 is smaller than the threshold. The force detector 31 determines that the force is excessively large when the force applied to the contactors 2111 and 2211 is equal to or more than the threshold.

The force detector 31 gives the measurement state obtainer 27a the information regarding the force applied to the contactors 2111 and 2211 detected by the force detector 31, as the information regarding the state in which the measured value is obtained. The information regarding the force applied to the contactors 2111 and 2211 is an example of the information regarding the state in which the measured values are obtained. The information regarding the force applied to the contactors 2111 and 2211 is also an example of operation state information regarding the operation state in which the measured value obtainer including the contactors 2111 and 2211 obtains the measured values.

The detection head 232 is electrically connected with the main controller 27. The back light controller 28 is electrically connected with the main controller 27. The back light controller 28 is also electrically connected with the back light 29. The back light controller 28 switches the state of supplying electrical power to the back light 29, by operating the switch 25. Thus, the back light controller 28 controls turning-on and turning-off of the back light 9. These functions are the same as those of the first embodiment.

The back light controller 28 has a back light-color changer 28a acting as an illumination color changer for changing the color of the back light 29. The back light-color changer 28a changes the color of the back light in accordance with the force applied to the contactors 2111 and 2211.

In this manner, the information regarding the force applied to the contactors 2111 and 2211 is obtained, because when the holding force of the contactors 2111 and 2211 is excessively large, the measurement object may be deformed and the precise measurement of the size may not be necessarily performed. And so, in the embodiment, it is determined whether the force applied to the contactors 2111 and 2211 is adequate or not. And, the liquid crystal display device 30 displays the determined result.

A description will be given of an example of a combination of the force applied to the contactors 2111 and 2211 and the color of the back light, on the basis of FIG. 9A to FIG. 9C. FIG. 9A to FIG. 9C illustrate the colors with use of types of hatching.

FIG. 9A illustrates the liquid crystal display device 30 before the contactors 2111 and 2211 hold the measurement object. Before the contactors 2111 and 2211 hold the measurement object, the back light 29 of FIG. 8 emits a green color light and the liquid crystal display device 30 glows green. On the other hand, FIG. 9B illustrates the liquid crystal display device 30 in a case where the measurement object is held by the contactors 2111 and 2211 with an adequate force. When the contactors 2111 and 2211 hold the measurement object with the adequate force, the back light 29 of FIG. 8 emits a blue color light and the liquid crystal display device 30 glows blue. FIG. 9C illustrates the liquid crystal display device 30 in a case where the contactors 2111 and 2211 hold the measurement object with an excessively large force. When the contactors 2111 and 2211 hold the measurement object with the excessively large force, the back light 29 emits a red color light and the liquid crystal display device 30 glows red.

In this manner, the color of the back light 29 changes in accordance with the force applied to the contactors 2111 and 2211. In other word, the color of the back light 29 changes in accordance with the force with which the contactors 2111 and 2211 hold the measurement object. Therefore, when the measuring person discriminates the color of the back light 29, the measuring person can immediately know whether the measuring using the caliper 20 is appropriately performed or not. The measuring person may change the operation of the caliper 20 in accordance with the color of the back light 29 and operate the slider 22 so that the color of the back light 29 is blue. It is therefore possible to perform precise measuring using the caliper 20.

In this manner, in the embodiment, the color of the back light 29 indicates the force with which the contactors 2111 and 2211 hold the measurement object (the force applied to the contactors 2111 and 2211). However, in FIG. 9A to FIG. 9C, a single color light is emitted to all area of the liquid crystal display device 10. On the other hand, the color of the back light 29 may gradually change in accordance with the force applied to the contactors 2111 and 2211.

In the embodiment, as one example, the color of the back light 29 changes among the three colors in accordance with the force applied to the contactors 2111 and 2211. However, the measuring person may optionally set the colors of the back light 29 by operating the operation button 26.

In the third embodiment, the description of the caliper 20 is given. However, other measuring devices, in which an illumination device for emitting a light to the display device is provided and the measurement object is held by contactors during the measuring, can change the color of the illumination device in accordance with the force applied to the contactors. Other measuring devices are such as a micrometer or the like.

Fourth Embodiment

Figure 10:
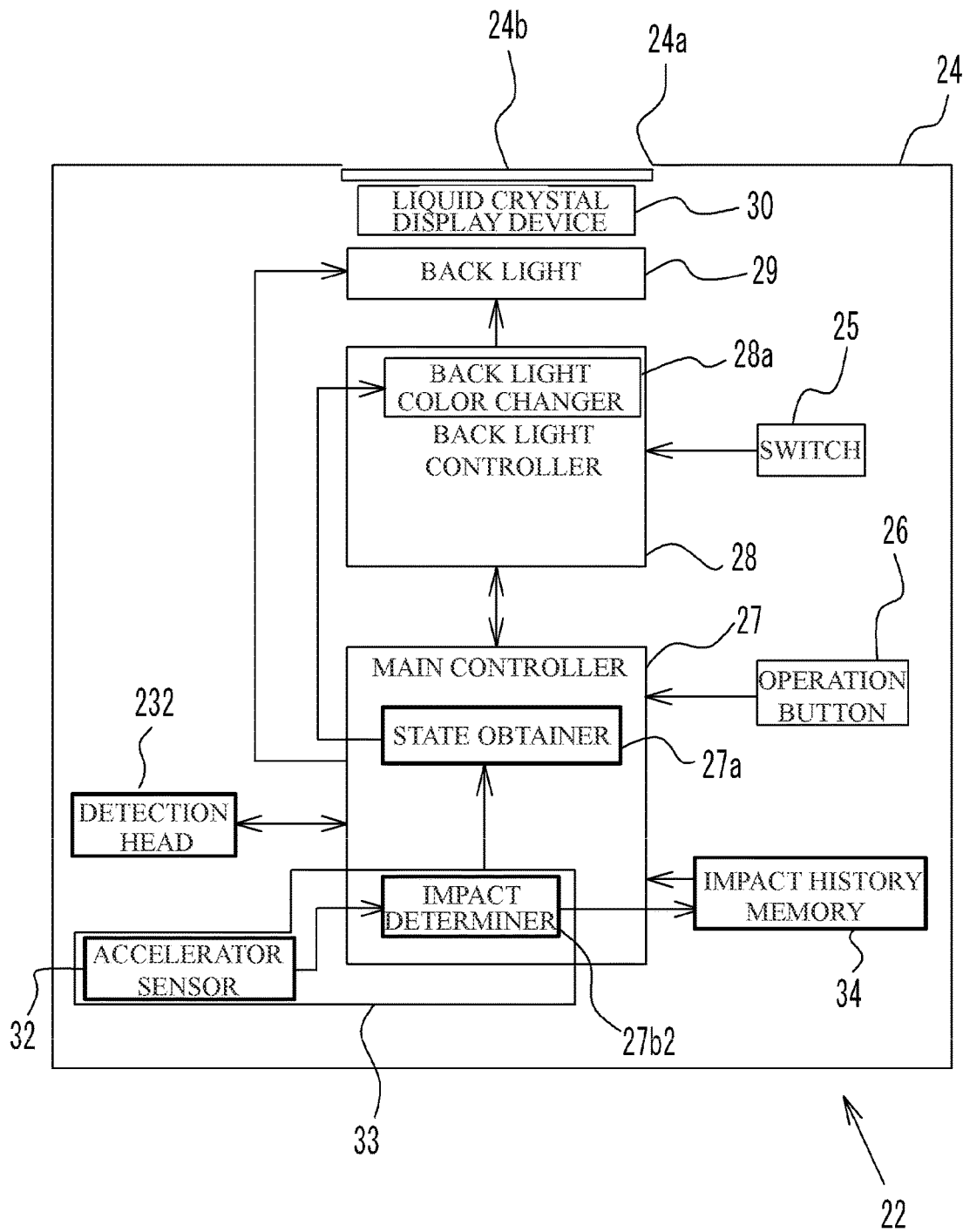
FIG. 10 illustrates an outline of an inner structure of a slider of a caliper of a fourth embodiment.
Figure 11A:
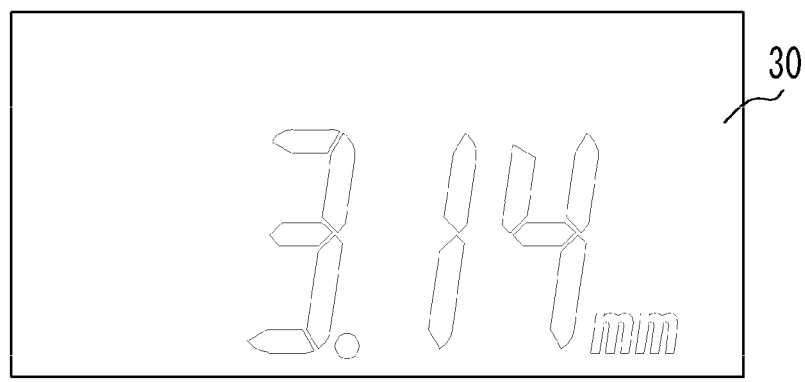
FIG. 11A illustrates a display example of a liquid crystal display device in a case where no impact is applied to a caliper.
Figure 11B:
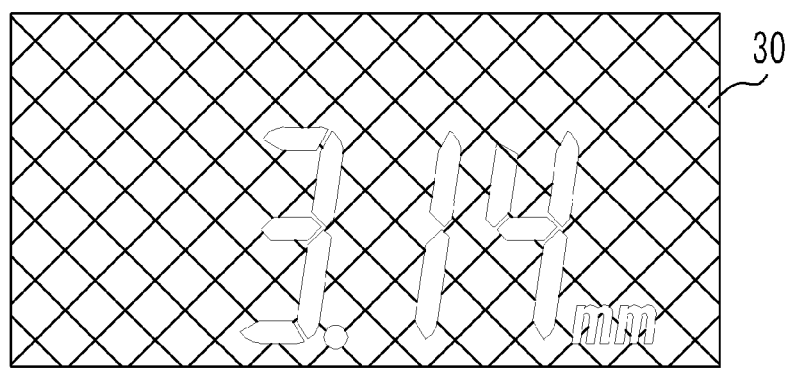
FIG. 11B illustrates a display example of a liquid crystal display device in a case where an impact is applied to a caliper.
Figure 12A:
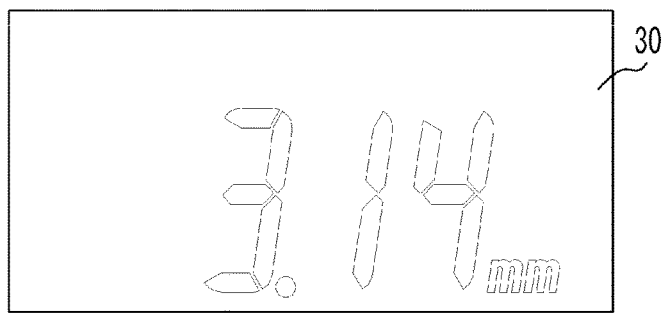
FIG. 12A illustrates an accumulated evaluation of an impact history of a caliper.
Figure 12A:
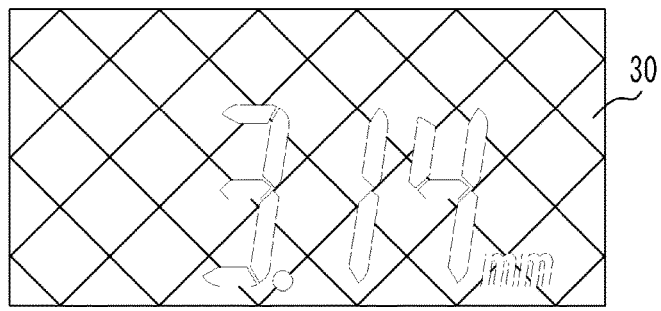
Figure 12A:
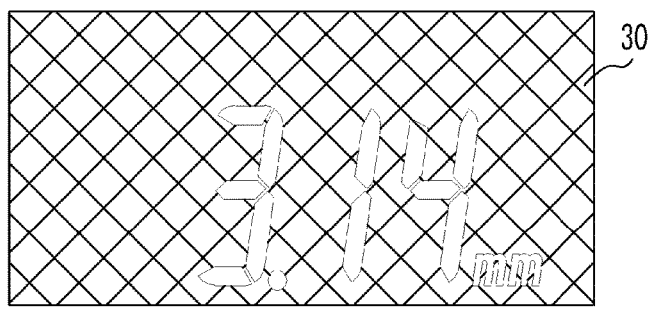

Next, a description will be given of a fourth embodiment, on the basis of FIG. 10 to FIG. 12D. FIG. 10 illustrates an inner structure of the slider 22 of the caliper 20 of the fourth embodiment. FIG. 11A illustrates a display example of the display device (the liquid crystal display device 30) in a case where an impact is not applied to the caliper 20. FIG. 11B illustrates a display example of the liquid crystal display device 30 in a case where an impact is applied to the caliper 20. FIG. 12A illustrates an accumulated evaluation of an impact history of the caliper 20. FIG. 12B illustrates a display example of the liquid crystal display device 30 in a case where the impact applied to the caliper 20 is small. FIG. 12C illustrates a display example of the liquid crystal display device 30 in a case where there is a history of the impact applied to the caliper 20 but the impact does not influence on the measurement. FIG. 12D illustrates a display example of the liquid crystal display device 30 in a case where there is a history in which the impact influencing on the measurement is applied to the caliper 20.

A description will be given of points of the fourth embodiment which are different from those of the third embodiment. In the fourth embodiment, the same reference numerals are added to the same structure elements in the figures, as those of the third embodiment. The same reference numerals are also added to the same structure elements not illustrated in FIG. 10 to FIG. 12D, as those of the third embodiment. Detail explanations of the same structure elements are omitted.

As illustrated in FIG. 10, in the fourth embodiment, an impact determiner 27b2 is provided in addition to the force calculator 27b1 of the caliper 20 of the third embodiment. The impact determiner 27b2 is included in an impact detector 33 together with an accelerator sensor 32. The impact detector 33 detects the impact applied to the main scale 21, the slider 22 and the encoder 23 of the measured value obtainer. The impact determiner 27b2 is electrically connected with an impact history memory 34. When the impact determiner 27b2 determines that the impact is applied, the impact history memory 34 stores the detected value of the accelerator sensor 32 at the impact. In FIG. 10, the force calculator 27b1 is omitted. The impact determiner 27b2 may be provided instead of the force calculator 27b1.

In concrete, the impact detector 33 detects an impact from the accelerator sensor 32 when the caliper 20 hits against a wall or falls to a floor. The value regarding the detected impact is used for the determination whether the caliper 20 can perform adequate measuring.

The impact detector 33 gives the measurement state obtainer 27a the information regarding the impact applied to the encoder 23 or the like of the measured value obtainer, as the information regarding the state in which the measured value is obtained. The information regarding the impact applied to the encoder 23 or the like is an example of the information regarding the state in which the measured value is obtained. The information regarding the impact applied to the encoder 23 or the like is also an example of the operations state information regarding the operation state in which the measured value obtainer including the encoder 23 obtains the measured value.

In this manner, the information regarding the impact applied to the measured value obtainer is obtained. This is because the encoder 23 is damaged and the accurate measuring may not be necessarily performed, when the impact is applied to the encoder 23. This is also because the main scale 21 or the slider 22 is distorted and the accurate measuring may not be necessarily performed, when the impact is applied to the caliper 20. In the embodiment, when the accelerator sensor 32 detects an impact applied to the caliper 20 which is larger than a predetermined impact, the liquid crystal display device 30 displays the fact that the caliper 20 is subjected to the impact.

A description will be given of an example of the color of the back light of a case where no impact is applied to the caliper 20 and a case where an impact is applied to the caliper 20, on the basis of FIG. 11A and FIG. 11B. In FIG. 11A and FIG. 11B, the type of the hatching indicates the colors.

FIG. 11A illustrates the liquid crystal display device 30 in the case where no impact is applied to the caliper 20. When no impact is applied to the caliper 20, the back light 29 emits a white color light and the liquid crystal display device glows white. On the other hand, FIG. 11B illustrates the liquid crystal display device 30 in the case where the impact is applied to the caliper 20. That is, FIG. 11B illustrates the liquid crystal display device 30 in the case where the impact determiner 27b2 determines that the impact is applied to the caliper 20. When the impact determiner 27b2 determines that the impact is applied to the caliper 20, the back light 29 emits a red color light to the liquid crystal display device 30 and the liquid crystal display device 30 glows red. A threshold of the impact for changing the color of the back light 29 to red is determined in advance. The threshold is a value at which the impact influences on the accurate measurement with use of the caliper 20 even if only one impact is applied to the caliper 20.

In this manner, the color of the back light 29 changes when an impact is applied to the caliper 20. Therefore, when the measuring person discriminates the color of the back light 29, the measuring person can immediately know whether it is possible to perform the accurate measuring with use of the caliper 20. For example, when the liquid crystal display device 30 glows red, the measuring person continues the measuring by using another caliper 20 which is prepared as a spare one. The measuring person can repair the caliper to which the impact has been applied.

The caliper 20 of the embodiment has the accelerator sensor 32 and can determine whether an impact is applied to the caliper 20 on the basis of the measured value of the accelerator sensor 32. It is thought that even if a single impact does not degrade the accurate measuring with use of the caliper 20, the measuring with use of the caliper 20 may be degraded when a plurality of impacts are applied to the caliper 20. And so, the caliper 20 determines the condition of the caliper 20 by performing the accumulated evaluation of the impacts on the basis of the impact history. And, the caliper 20 displays the determined results in steps with use of the back light colors.

As illustrated in FIG. 12A, a first threshold and a second threshold are determined with respect to the evaluation of the impact history. The evaluation of the impact history is made on the basis of the history stored in a movement history memory 36 of FIG. 13. The evaluation of the impact history is classified into three phases by the first threshold and the second threshold.

When the accumulated evaluation of the impact history does not reach the first threshold, it is evaluated that the impact is small. Even if the caliper 20 is normally used, a slight impact may occur. When the accumulated evaluation of the impact history is smaller than the first threshold and the impact history is negligible in the measuring, it is possible to continuously use the caliper 20.

When the accumulated evaluation of the impact history is between the first threshold and the second threshold, it is evaluated that there is a history of the impact but the history is negligible in the measuring. When the impact applied to the caliper 20 is accumulated, it is thought that the impact gradually influences on the measuring. When the accumulated evaluation of the impact history is between the first threshold and the second threshold, it may not be necessarily possible to perform the accurate measuring. However, the maintenance of the caliper 20 is recommended.

When the accumulated evaluation of the impact history exceeds the second threshold, it is evaluated that there is a history of an impact influencing on the accuracy of the measuring. In this case, the measuring person may repair the caliper 20 to which the impact is applied and continues measuring with use of another caliper 20 which is prepared as a spare.

A description will be given of the accumulated evaluation of the impact history and an example of the combination of the back light colors, on the basis of FIG. 12B to FIG. 12D. FIG. 12B to FIG. 12D illustrate a difference of colors with use of types of hatching.

FIG. 12B illustrates the liquid crystal display device 30 in a case where the accumulated evaluation of the impact history is smaller than the first threshold. When the accumulated evaluation of the impact history is smaller than the first threshold, the back light 29 of FIG. 10 emits a white color to the liquid crystal display device 30 and the liquid crystal display device 30 glows white. On the other hand, FIG. 12C illustrates the liquid crystal display device 30 in a case where the accumulated evaluation of the impact history is between the first threshold and the second threshold. When the accumulated evaluation of the impact history is between the first threshold and the second threshold, the back light 29 emits a blue color light to the liquid crystal display device 30 and the liquid crystal display device 30 glows blue. FIG. 12D illustrates the liquid crystal display device 30 in a case where the accumulated evaluation of the impact history is larger than the second threshold. When the accumulated evaluation of the impact history is larger than the second threshold, the back light 29 emits a red color light to the liquid crystal display device 30 and the liquid crystal display device 30 glows red.

In this manner, the color of the back light 29 changes in accordance with the accumulated evaluation of the impact history. Therefore, when the measuring person discriminates the color of the back light 29, the measuring person can immediately know whether it is possible to perform the adequate measuring with use of the caliper 20. The measuring person can adequately take measures in accordance with the color of the back light 29.

The embodiment can be applied to other settings of colors and other measuring devices, as well as other embodiments.

Fifth Embodiment

Figure 13:
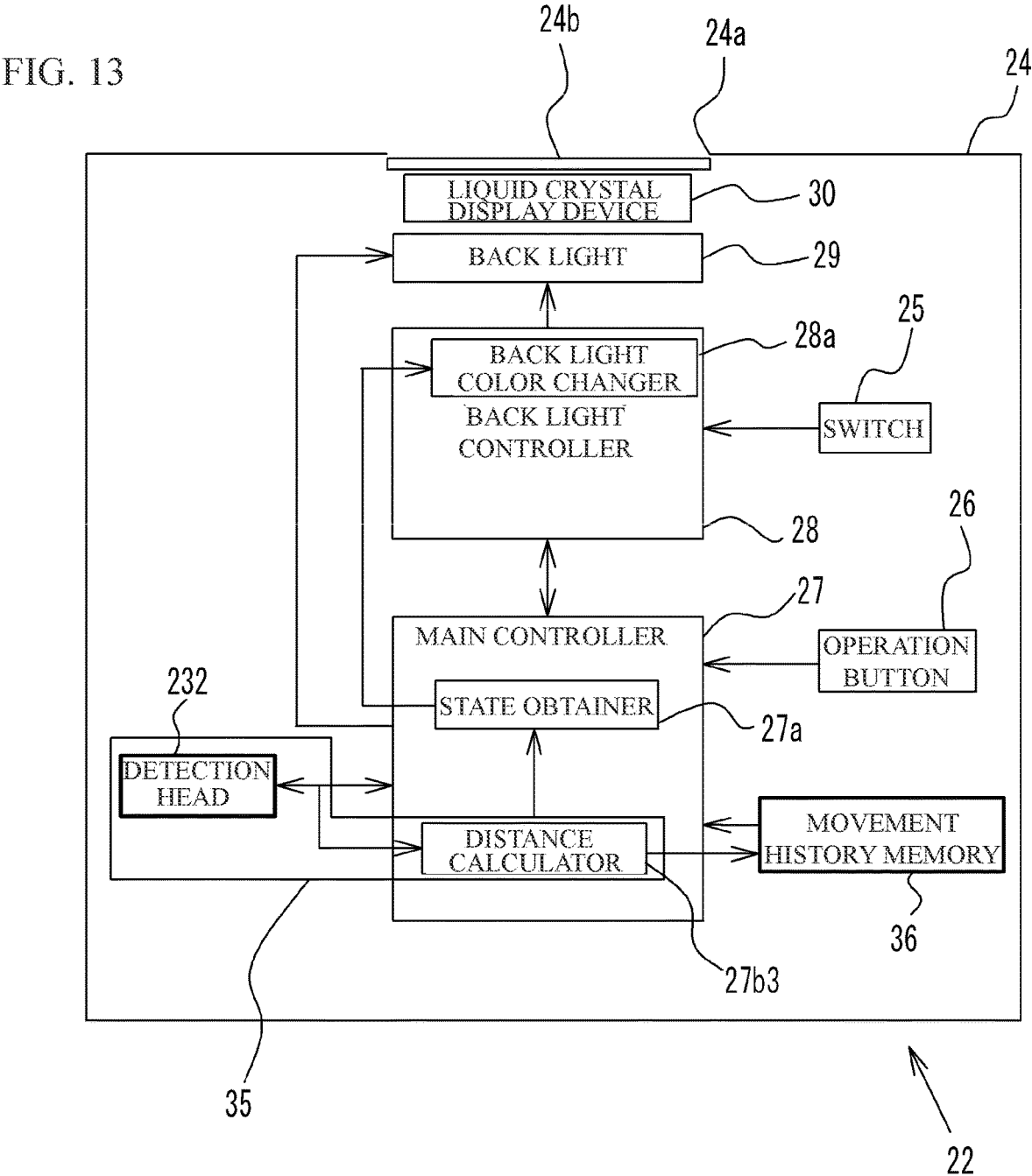
FIG. 13 illustrates an outline of an inner structure of a slider of a caliper of a fifth embodiment.
Figure 14A:
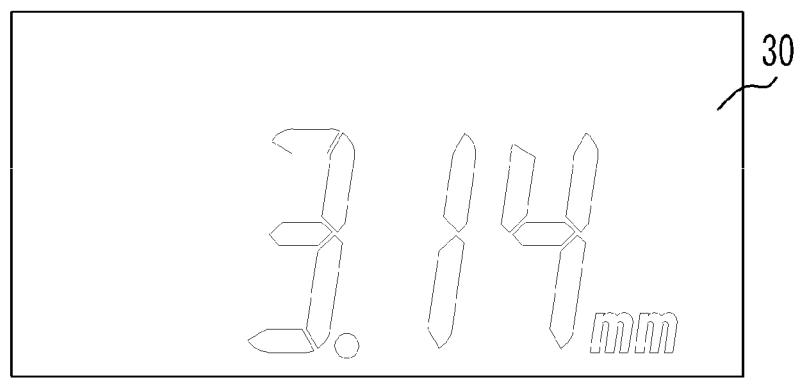
FIG. 14A illustrates a display example of a display device in a case where maintenance of a caliper is not needed.
Figure 14B:
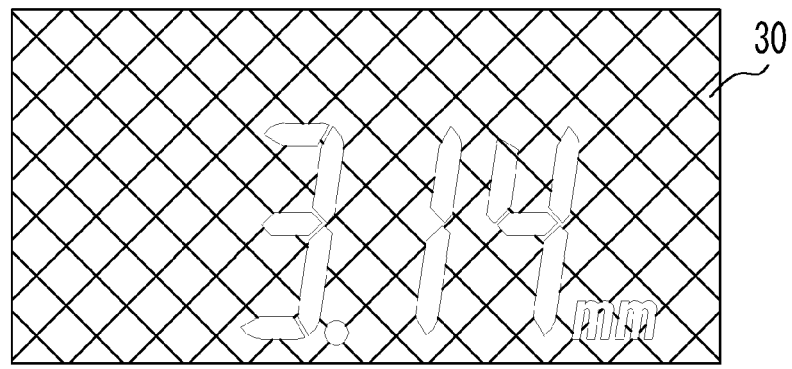
FIG. 14B illustrates a display example of a display device in a case where maintenance of a caliper is needed.
Figure 15A:
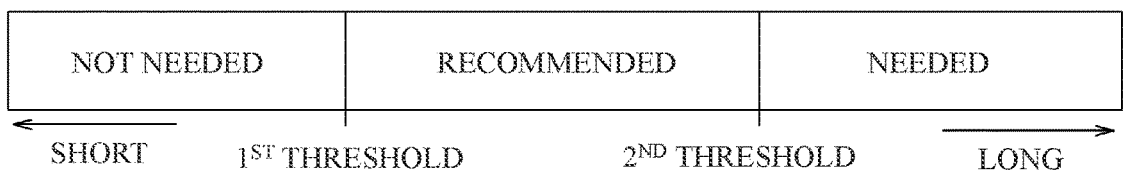
FIG. 15A illustrates evaluation of a movement distance history of a slider.
Figure 15A:
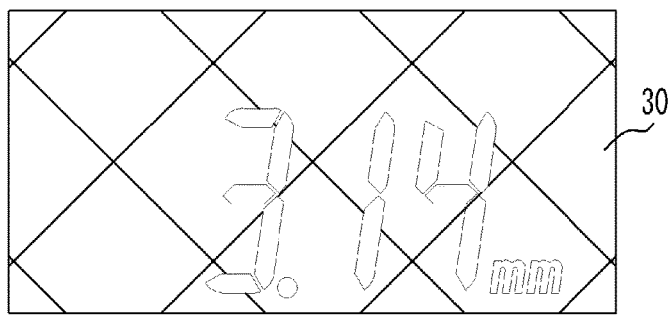
Figure 15A:
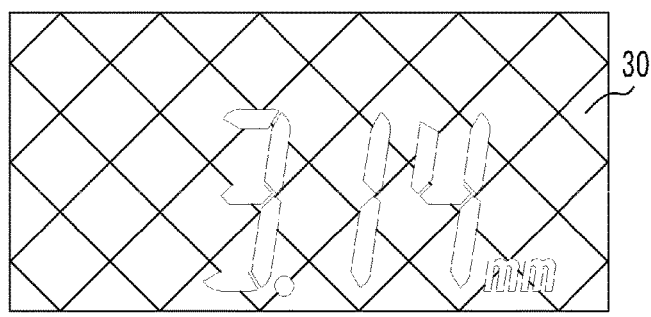
Figure 15A:
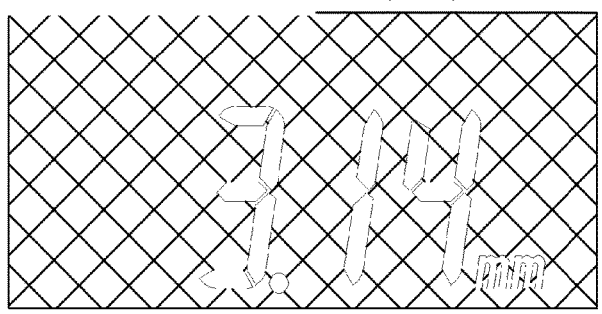

Next, a description will be given of a fifth embodiment on the basis of FIG. 13 to FIG. 15D. FIG. 13 illustrates an inner structure of the slider 22 of the caliper 20 of the fifth embodiment. FIG. 14A illustrates a display example of the display device (the liquid crystal display device 30) in a case where maintenance of the caliper 20 is not needed. FIG. 14B illustrates a display example of the display device in a case where the maintenance of the caliper 20 is needed. FIG. 15A illustrates evaluation of a movement distance history of the slider 22. FIG. 15B illustrates a display example of the display device in a case where the maintenance of the caliper 20 is not needed. FIG. 15C illustrates a display example of the display device in a case where the maintenance of the caliper 20 is recommended. FIG. 15D illustrates a display example of the display device in a case where the maintenance of the caliper 20 is needed.

A description will be given of points of the fifth embodiment which are different from those of the third embodiment. In the fifth embodiment, the same reference numerals are added to the same structure elements in the figures, as those of the third embodiment. The same reference numerals are also added to the same structure elements not illustrated in FIG. 13 to FIG. 15, as those of the first embodiment. Detail explanations of the same structure elements are omitted.

As illustrated in FIG. 13, in the fifth embodiment, a movement distance calculator 27b3 is provided in addition to the force calculator 27b1 of the caliper 20 of the third embodiment. The movement distance calculator 27b3 is included in a movement distance measurer 35 together with the detection head 232. The movement distance measurer 35 measures the movement distance of the slider 22. The movement distance calculator 27b3 is electrically connected with the movement history memory 36. The movement history memory 36 stores the movement distance of the slider 22 calculated by the movement distance calculator 27b3. In FIG. 13, the force calculator 27b1 is omitted. The movement distance calculator 27b3 may be provided instead of the force calculator 27b1.

In concrete, the movement distance measurer 35 measures a distance the slider 22 slides with respect to the main scale 21. When the slider 22 repeats the sliding with respect to the main scale 21, the slider 22 needs maintenance because rattling occurs in the slider 22. The movement distance of the slider 22 is used for determining whether the maintenance of the caliper 20 is necessary or not.

The movement distance measurer 35 gives the measurement state obtainer 27a information regarding the movement distance of the slider 22 (mover) of the measured value obtainer, as the information regarding the state in which the measured value is obtained. The information regarding the movement distance of the slider 22 is an example of the information regarding the state in which the measured value is obtained. The information regarding the movement distance of the slider 22 is also an example of the information regarding the operations state in which the measured value obtainer including the slider 22 obtains the measured value.

In this manner, the information regarding the movement distance of the slider 22 is obtained in order to detect the possibility that the rattling between the slider 22 and the main scale 21 caused by frictional wear causes degradation of the measuring if the distance the slider 22 slides with respect to the main scale 21 gets longer. In the embodiment, when the movement distance of the slider 22 exceeds a predetermined value, the liquid crystal display device 30 displays the results that the movement distance exceeds the predetermined value.

A description will be given of an example of the back light colors in a case where the maintenance of the caliper 20 is not needed and in a case where the maintenance of the caliper 20 is needed, on the basis of FIG. 14A and FIG. 14B. FIG. 14A and FIG. 14B illustrate a difference of colors with use of types of hatching.

FIG. 14A illustrates the liquid crystal display device 30 in a case where the movement distance of the slider 22 is not large and the maintenance of the caliper 20 is not needed. When the maintenance of the caliper 20 is not needed, the back light 29 of FIG. 13 emits a white color light to the liquid crystal display device 30 and the liquid crystal display device 30 glows white. On the other hand, FIG. 14B illustrates the liquid crystal display device 30 in a case where the movement distance of the slider 22 gets larger and the maintenance of the caliper 20 is needed. When the maintenance of the caliper 20 is needed, the back light 29 emits a red color light to the liquid crystal display device 30 and the liquid crystal display device 30 glows red. A threshold of the movement distance for changing the color of the back light 29 to red is determined in advance. The threshold is a value at which the accurate measuring of the caliper 20 is degraded.

In this manner, the color of the back light 29 changes when the movement distance of the slider 22 gets larger. Therefore, when the measuring person discriminates the color of the back light 29, the measuring person can know whether it is possible to perform the accurate measuring with use of the caliper 20. For example, when the liquid crystal display device 30 glows red, the measuring person continues the measuring by using another caliper 20 which is prepared as a spare one. The measuring person can repair the caliper of which the movement distance is large.

It is thought that the influence of the movement distance of the slider 22 on the accurate measuring with use of the caliper 20 gradually appears as the movement distance is accumulated. And so, the caliper 20 of the embodiment determines the condition of the caliper 20 by evaluating the movement distance history. And, the determined result is displayed in steps with use of the back light color.

As illustrated in FIG. 15A, a first threshold and a second threshold are determined with respect to the evaluation of the movement distance history. The evaluation of the movement history is made on the basis of the history stored in the movement history memory 36 of FIG. 13. The evaluation of the movement distance history is classified into three phases by the first threshold and the second threshold.

When the evaluation of the movement distance history does not reach the first threshold, it is evaluated that the maintenance is not needed. When it is thought that the movement distance of the slider 22 is negligible in the measuring, it is possible to continue the using of the caliper 20.

When the evaluation of the movement distance history is between the first threshold and the second threshold, it is evaluated that the maintenance is recommended. When the movement distance of the slider 22 gets larger, it is thought that the movement distance gradually influences on the accuracy of the measuring. When the evaluation of the movement distance history is between the first threshold and the second threshold, it may not be necessarily possible to perform the accurate measuring. However, the maintenance of the caliper 20 is recommended before the measuring is degraded.

When the evaluation of the movement distance history exceeds the second threshold, it is evaluated that the maintenance is needed. In this case, the caliper 20 is repaired, and the measuring person continues the measuring with use of another caliper 20 which is prepared as a spare.

A description will be given of the evaluation of the movement distance history and the combination of the back light colors, on the basis of FIG. 15B to FIG. 15D. FIG. 15B to FIG. 15D illustrates a difference of colors with use of types of hatching.

FIG. 15B illustrates the liquid crystal display device 30 in a case where the evaluation of the movement distance history is smaller than the first threshold. When the evaluation of the movement distance history is smaller than the first threshold, the back light 29 of FIG. 13 emits a white color light to the liquid crystal display device 30 and the liquid crystal display device 30 glows white. On the other hand, FIG. 15C illustrates the liquid crystal display device 30 in a case where the evaluation of the movement distance history is between the first threshold and the second threshold. When the evaluation of the movement distance history is between the first threshold and the second threshold, the back light 29 emits a blue color light to the liquid crystal display device 30 and the liquid crystal display device 30 glows blue. FIG. 15D illustrates the liquid crystal display device 30 in a case where the evaluation of the movement distance history is larger than the second threshold. When the evaluation of the movement distance history is larger than the second threshold, the back light 29 emits a red color light and the liquid crystal display device 30 glows red.

In this manner, the color of the back light 29 changes in accordance with the evaluation of the movement distance history. Therefore, when the measuring person discriminates the color of the back light 29, the measuring person can immediately know whether it is possible to perform the adequate measuring with use of the caliper 20. The measuring person can adequately take measures in accordance with the color of the back light 29.

The embodiment can be applied to other settings of colors and other measuring devices, as well as other embodiments.

The measuring device of the above-mentioned embodiment changes the light color of the back light (the illumination device) in accordance with the measurement state obtained by the measurement state obtainer. Therefore, the measuring person can understand the measurement state even if the measuring person does not read letters or the like displayed on the liquid crystal display device (the display device).

The measuring device of the above-mentioned embodiment changes the light color of the back light in accordance with the selected measurement mode information. Therefore, the measuring person can immediately understand which measurement mode is selected.

The measuring device of the above-mentioned embodiment changes the light color of the back light in accordance with the operation state information regarding the operations state in which the measured value obtainer obtains the measured value. Therefore, the measuring person can immediately understand the operation state of the measuring device and correct the operation method.

The measuring device of the above-mentioned embodiment changes the light color of the back light in accordance with the usage history regarding the usage history of the measured value obtainer. Therefore, the measuring person can immediately understand the state of the measuring device and repair the measuring device.

The present invention is not limited to the specifically disclosed embodiments and variations but may include other embodiments and variations without departing from the scope of the present invention.

What is claimed is:

1. A precision length measuring device comprising: a display device; an illumination device configured to emit a light to the display device; an impact detector that detects impacts caused by hitting or falling; a memory; and a processor coupled to the memory and configured to execute a process, the process comprising: obtaining a measured value; obtaining information regarding a state in which the measured value is obtained; obtaining an evaluation of an impact history based on values detected by the impact detector, said values detected by the impact detector being a history of impacts applied to the precision length measuring device for a period other than while obtaining the measured value, as impact history evaluation information; and changing a color of the light emitted by the illumination device in accordance with the impact history evaluation information, wherein the display device displays the measured value.

2. The precision length measuring device as claimed in claim 1, wherein the process further comprises: obtaining measurement mode information regarding a measurement mode that is selected when the measured value is obtained, as the information regarding the state in which the measured value is obtained; and changing the color of the light in accordance with the measurement mode information that is obtained.

3. The precision length measuring device as claimed in claim 2, wherein the process further comprises obtaining information whether a tolerance determination mode, in which it is determined whether a measured result with respect to a measurement object is within a predetermined tolerance, is selected or not, as the measurement mode information.

4. The precision length measuring device as claimed in claim 2, wherein the process further comprises obtaining information whether a maximum-minimum measurement mode, in which at least a maximum value or a minimum value of a measured value of a measurement object is obtained, is selected or not, as the measurement mode information.

5. The precision length measuring device as claimed in claim 1, wherein the process further comprises: obtaining operation state information regarding an operation state in which a measured value obtainer obtains the measured value, as information regarding the state in which the measured value is obtained; and changing the color of the light in accordance with the operation state information.

6. The precision length measuring device as claimed in claim 5, wherein the process further comprises obtaining information regarding a moving speed of a mover of the measured value obtainer, as the operation state information.

7. The precision length measuring device as claimed in claim 5, wherein the process further comprises obtaining information regarding a force applied to a contactor of the measured value obtainer, as the operation state information.

8. The precision length measuring device as claimed in claim 1, wherein the process further comprises: obtaining usage history information regarding the precision length measuring device as information regarding the state in which the measured value is obtained, the usage history information includes the impact history; and changing the color of the light in accordance with the usage history information.

9. The precision length measuring device as claimed in claim 1, wherein the process further comprises changing the color of the light in steps in accordance with the impact history evaluation information.

10. The precision length measuring device as claimed in claim 8, wherein the process further comprises obtaining information regarding a movement distance of a mover of a measured value obtainer as the usage history information.

11. The precision length measuring device as claimed in claim 10, wherein the process further comprises changing the color of the light in steps in accordance with a length of a movement distance of the mover.

\* \* \* \* \*